United States Patent
Tanabe et al.

(10) Patent No.: US 8,553,362 B2
(45) Date of Patent: Oct. 8, 2013

(54) MAGNETIC RECORDING HEAD WITH ADJACENT TRACK INTERFERENCE SUPPRESION BY NOVEL MICROWAVE-ASSISTED MAGNETIC RECORDING ELEMENT

(75) Inventors: Hiroyasu Tanabe, Yokohama (JP); Hiroyasu Masuda, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/226,435

(22) Filed: Sep. 6, 2011

(65) Prior Publication Data

US 2013/0057983 A1 Mar. 7, 2013

(51) Int. Cl.
*G11B 5/127* (2006.01)
*G11B 5/23* (2006.01)
*G11B 5/265* (2006.01)

(52) U.S. Cl.
USPC ........................................ 360/125.3

(58) Field of Classification Search
USPC ............... 360/313, 324–324.12, 125.3
See application file for complete search history.

(56) References Cited

U.S. PATENT DOCUMENTS

| 7,027,248 | B2 | 4/2006 | Hamaguchi et al. |
| 7,525,765 | B2 | 4/2009 | Kurita et al. |
| 7,724,469 | B2 | 5/2010 | Gao et al. |
| 8,164,861 | B2 * | 4/2012 | Braganca et al. ............. 360/313 |
| 8,194,361 | B2 * | 6/2012 | Kudo et al. .............. 360/324.11 |
| 8,259,409 | B2 * | 9/2012 | Braganca et al. ............. 360/110 |
| 8,270,112 | B2 * | 9/2012 | Funayama et al. ........ 360/125.31 |
| 2009/0059423 | A1 | 3/2009 | Yamada et al. |
| 2009/0080120 | A1 | 3/2009 | Funayama et al. |
| 2010/0007996 | A1 | 1/2010 | Iwasaki et al. |
| 2010/0053794 | A1 | 3/2010 | Mashima et al. |
| 2010/0214692 | A1 | 8/2010 | Kief et al. |

(Continued)

FOREIGN PATENT DOCUMENTS

JP 2009080867 A * 4/2009
JP 20101062531 A 3/2010

OTHER PUBLICATIONS

Zhu et al., "Microwave Assisted Magnetic Recording Utilizing Perpendicular Spin Torque Oscillator With Switchable Perpendicular Electrodes," 2010 IEEE, IEEE Transactions on Magnetics, vol. 46, No. 3, Mar. 2010, pp. 751-757'.

(Continued)

*Primary Examiner* — Will J Kilmowicz
(74) *Attorney, Agent, or Firm* — Zilka-Kotab, PC

(57) ABSTRACT

A magnetic write head for magnetic data recording that incorporates a novel magnetic oscillation generator stricture that sets up a magnetic oscillation in the magnetic media for improving writing and that also narrows the write width and reduces adjacent track interference by suppressing writing in regions outside of the desired data track. The magnetic oscillation generating structure includes a centrally disposed magnetic assist element that generates an oscillating magnetic field that oscillates in a direction that will assist the write pole in writing to the magnetic medium. The magnetic oscillation generating structure also includes first and second magnetic non-assist elements at either side of the assist element. The non-assist elements generate a magnetic field that oscillates in a second direction that is opposite to the first direction, which counteracts the magnetic write assist from the centrally disposed magnetic assist element and acts to suppress writing in these side regions.

11 Claims, 6 Drawing Sheets

(56) References Cited

U.S. PATENT DOCUMENTS

2010/0321993 A1* 12/2010 Nikonov et al. ............. 365/171
2010/0328799 A1* 12/2010 Braganca et al. ............. 360/31
2011/0007431 A1    1/2011 Braganca et al.
2011/0141629 A1*  6/2011 Braganca et al. ............. 360/313
2012/0250180 A1* 10/2012 Mizushima et al. ............ 360/75

OTHER PUBLICATIONS

Tang et al., "Narrow Track Confinement by AC Field Generation Layer in Microwave Assisted Magnetic Recording," 2008 IEEE, IEEE Transactions on Magnetics, vol. 44, No. 11, Nov. 2008, pp. 3376-3379.

* cited by examiner

MAGNETIC RECORDING HEAD WITH ADJACENT TRACK INTERFERENCE SUPPRESION BY NOVEL MICROWAVE-ASSISTED MAGNETIC RECORDING ELEMENT

FIELD OF THE INVENTION

The present invention relates to magnetic data recording, and more particularly to a magnetic recording head that uses a novel magnetic microwave element for both write assist and also suppression of adjacent track interference.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

At very small bit size and high data density it becomes ever more difficult to write a stable magnetic bit on the magnetic media while also avoiding adjacent track interference. In order for the recorded magnetic bit to remain stable at very small bit sizes the magnetic coercivity of the media must be increased. However, this increased magnetic coercivity of the magnetic medium also requires a corresponding increase in field strength to record to the medium. However, as the size of the write pole shrinks (to generate the necessarily small recording bit) it becomes even harder to produce a strong enough field to record to the media. One method that has been proposed to overcome this obstacle has been to locally heat the media near the write pole, thereby temporarily lowering the coercivity of the media. This method has been referred to as thermally assisted recording. However, when locally heating the media sufficiently to allow recording of the bit, other adjacent tracks are inadvertently heated as well, which can lead to the erasure of or interference with adjacent data tracks, a problem that is especially problematic when the spacing between the data tracks in decreased in order to increase data density. Therefore, there remains a need for a technique for improving writeability at high data density, while also suppressing adjacent track interference.

SUMMARY OF THE INVENTION

The present invention provides a magnetic write head for magnetic data recording that includes, a magnetic write pole having first and second sides and having a width defined by a distance between the first and second sides and a magnetic oscillation generator adjacent to the magnetic write pole. The magnetic oscillation generator further comprises, a centrally disposed magnetic assist element configured to generate an oscillating magnetic field that assists with magnetic data writing; and first and second magnetic non-assist elements each configured to generate an oscillating magnetic field that does not assist with magnetic data writing, the centrally disposed magnetic assist element being located between the first and second magnetic non-assist elements.

A magnetic oscillation from a magnetic oscillation generator can assist in writing to a magnetic media by setting up a magnetic resonance in the magnetic media that temporarily reduces the magnetic resonance of the magnetic media, making it easier for a magnetic write field from the write pole to magnetically switch the media. However, increasing the ability to write to the media is not the only concern in a magnetic data recording system. It is also important that the adjacent track not be inadvertently affected by the write head.

The present invention advantageously improves writing in a desired narrow write region while also suppressing writing in regions outside of this narrow region. The centrally disposed assist element sets up a magnetization in a first direction that is designed to assist writing. The non-assist elements on either side of the assist element generate an oscillation in an opposite direction that counteracts the oscillation from the assist element in the side regions to suppress the oscillation assist in the side regions, thereby preventing adjacent track interference and effectively narrowing the track width and increasing data density.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
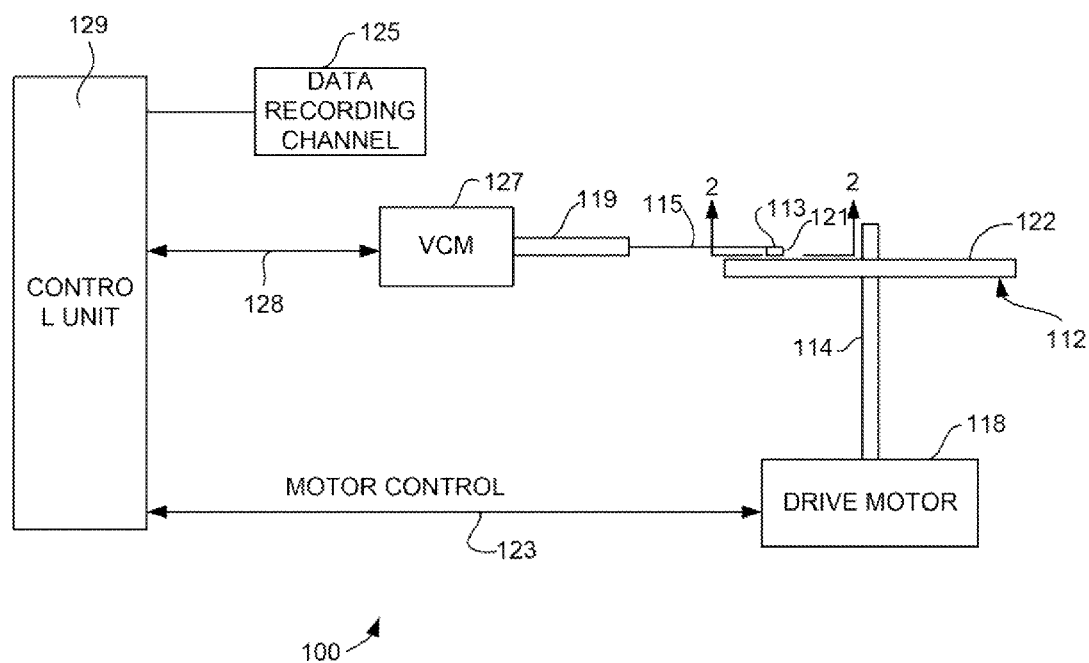
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
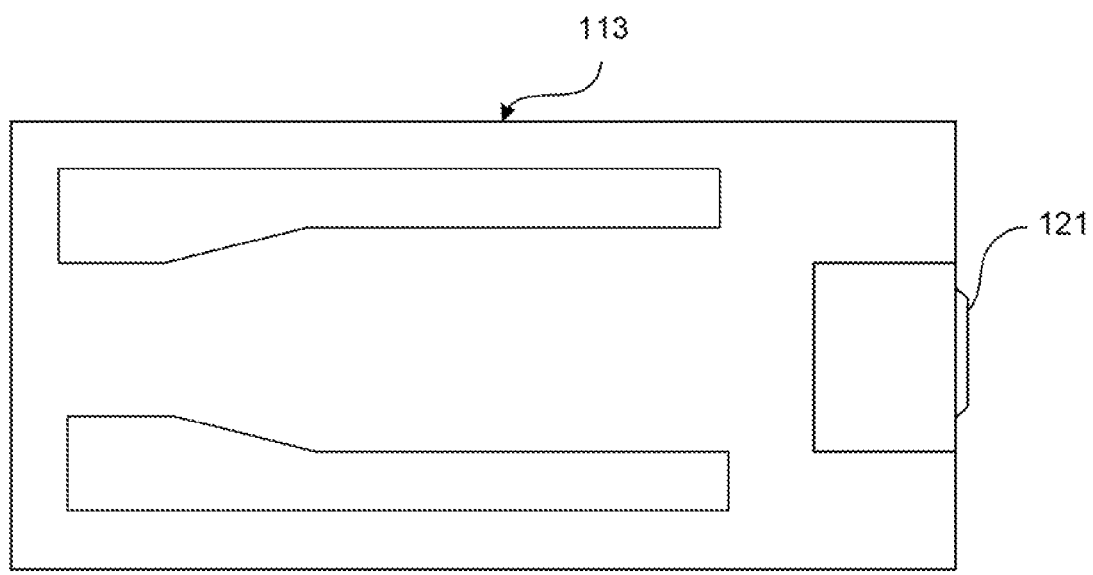
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
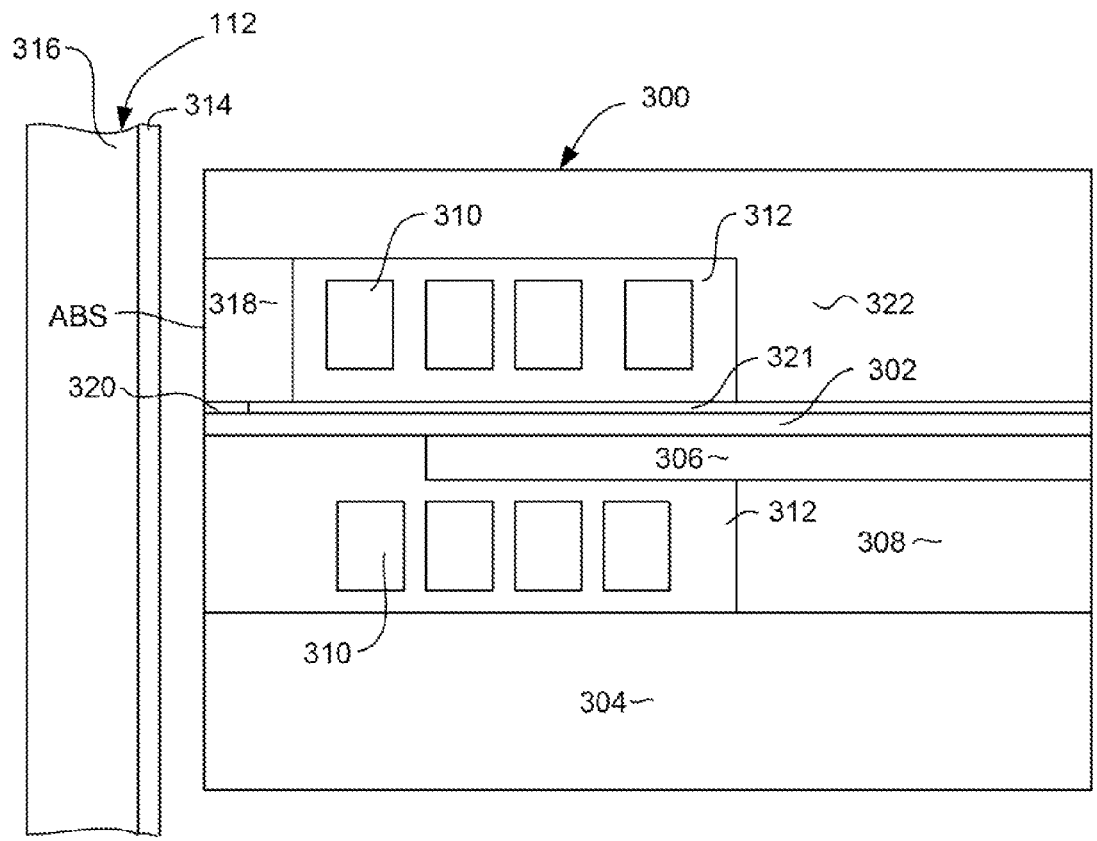
FIG. 3 is a side view of a magnetic head, taken from line 3-3 of FIG. 2 and rotated 90 degrees counterclockwise, of a magnetic head according to an embodiment of the present invention.

FIG. 3 is a side cross sectional view of a magnetic write head 300 that can be constructed by a method of the present invention. The write head 300 includes a magnetic write pole 302 and a magnetic return pole 304. The magnetic write pole 302 can be connected with a magnetic shaping layer 306 that helps to conduct magnetic flux to the tip of the write pole 302. The write pole 302 and shaping layer 306 can be connected with the magnetic return pole 304 by a magnetic back gap structure 308. A non-magnetic, electrically conductive write coil 310 passes between the return pole 304 and the write pole and shaping layer 302, 306, and may also pass above the write pole and shaping layer 302, 306. The write coil 310 can be encased in a non-magnetic, electrically insulating material 312, which can be a material such as alumina and/or hard baked photoresist. When an electrical current flows through the write coil 310, a magnetic field is induced around the coil 310 that results in a magnetic flux flowing through the return pole 304, back gap layer 308, shaping layer 306 and write pole 302. This results in a write field being emitted from the tip of the write pole 302. This strong, highly concentrated write field locally magnetizes a magnetic top layer 314 of the magnetic media 112. The magnetic field then travels through a soft magnetic under-layer 316 of the magnetic media before returning to the return pole 304, where it is sufficiently spread out and weak that it does not erase the previously recorded bit of data. The write head 300 can also include a magnetic pedestal 305, at the ABS that acts as a shield to prevent stray fields, such as those from the write coil 310 from reaching the magnetic medium 112.

The write head 300 also includes a trailing magnetic shield 318, located at the air bearing surface (ABS) and separated from the write pole 302 by a magnetic oscillation generator 320 that provides a magnetic oscillation for improved writing as will be described in greater detail herein below. A non-magnetic gap layer 321 is also provided to ensure that the trailing magnetic shield 318 is magnetically separated from the write pole 302. The non-magnetic trailing gap layer 321 can be constructed of a material such as alumina. The trailing magnetic shield 318 can be connected with the other magnetic structures at the back of the write head 300 by a trailing magnetic pole 322. The trailing shield 318 increases the write field gradient for improved writing.

One way to increase data density is to increase the number of data tracks per inch (TPI), also referred to as track pitch, which requires narrowing the magnetic recording width. TO narrow the magnetic recording width, the width of the write pole 302 must be reduced, but this also results in a reduced magnetic write field, making such a reduction in width (or increase in TPI) difficult. In addition, since the main pole has a complex structure, a reduced magnetic write pole width leads to increased fabrication errors and increases the number of scrapped heads that do not have the desired small width.

One way to improve writeability is to use an oscillating magnetic field generator within the write head that can excite a magnetic resonance, and induce the magnetization reversal of the magnetic recording medium. Such an oscillating magnetic field temporarily reduces the magnetic anisotropy of the magnetic medium, allowing for easier writing, even with a smaller write pole and reduces write field. Such a system can be referred to as micro-wave assisted writing, because the frequency of oscillation of the assisting oscillating magnetic field is preferably in the microwave range. However, a problem that arises with the use of such systems the width of the magnetic field from the write pole is large compared to the assist width and adjacent tracks of data can be erased.

Figure 4:
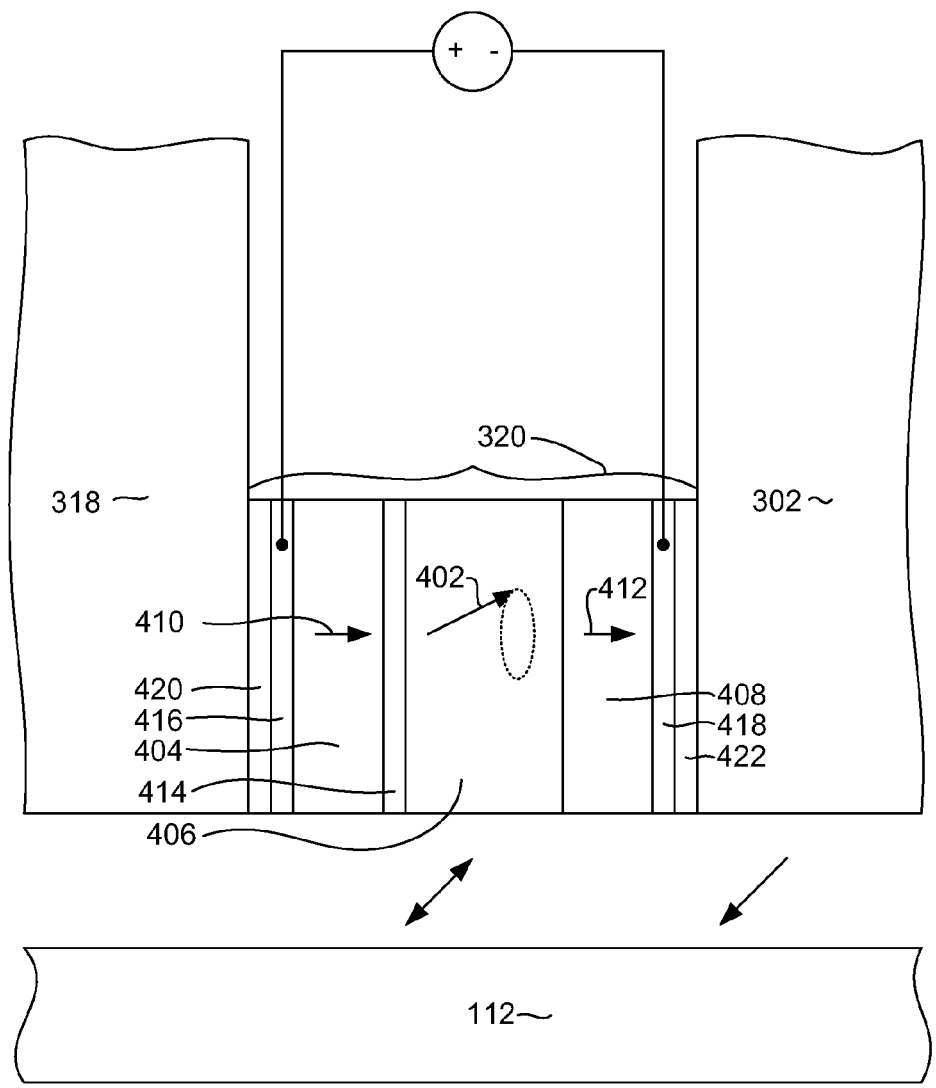
FIG. 4 is an enlarged side view of a portion of the write head of FIG. 3 shown rotated 90 counterclockwise.

The present invention however overcomes this, providing a microwave assisted recording system that advantageously reduces track width while improving writeabilty and also decreasing adjacent track interference. FIG. 4 shows an enlarged view of the pole tip portion of the structure of FIG. 3, the view being rotated 90 counterclockwise from that of FIG. 3. FIG. 3 shows a portion of the write pole 302 and trailing shield 318 and the magnetic oscillation generator 320 sandwiched there-between. The magnetic oscillation generator uses a spin torque oscillation effect to generate a magnetic field 402 that oscillates in a processional manner as shown. In order to produce this oscillating magnetic field 402, the oscillation generator 320 includes a magnetic spin rectifying layer 404, a field generation layer 406 and a magnetic zone control layer 408. The spin rectifying layer 404 and the magnetic zone control layer 408 each have magnetizations 410, 412 that are pinned in a desired direction as shown in FIG. 4. This pinning can be a current induced pinning or could be generated by exchange coupling with a layer of antiferromagnetic material (not shown). A magnetic interlayer 414 is sandwiched between the spin rectifying layer 404 and the field generating layer 406.

Electrically conductive leads 416, 418 are also provided at either end of the oscillation generator 320 to provide an electrical current to flow through the generator 320 to induce the magnetic oscillation 402. In addition, electrically insulating layers 420, 422 separate the rest of the magnetic oscillation generator 320 from the write pole 302 and shield 318. When an electrical current flows through the oscillation generator 320, electrons passing through the magnetically pinned spin rectifying layer 404 and the magnetic interlayer 414 they become polarized. These polarized electrons interact with the magnetic material of the field generation layer 406 to generate the magnetic oscillation 402 when in the presence of an external magnetic field such as from the write pole 302.

Figure 5:
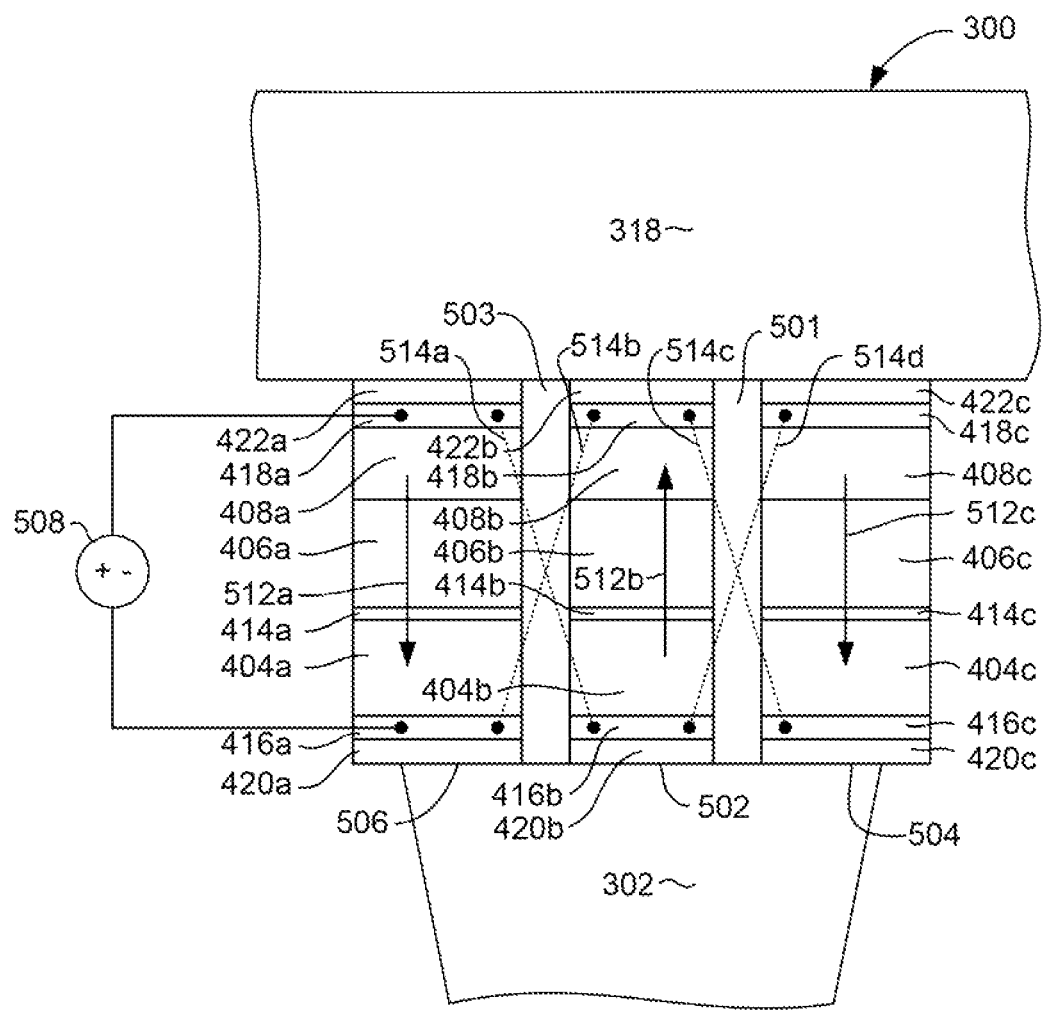
FIG. 5 is an ABS view of the portion of the write head shown in FIG. 4.

FIG. 5 shows a view of a portion of the head 300 as seen from the ABS. In this ABS view it can be seen that the magnetic oscillation generator includes a plurality of elements. At the center is an assist element 502. At right and left sides of the assist element, are first and second non-assist elements 504, 506, which are separated from the center element 502 by insulation layers 501, 503. The central assist element 502 is configured so as to generate an oscillating magnetic field that assists writing to the magnetic medium 112 (FIG. 4). Whereas the first and second non-assist elements 504, 506 are configured to generate an oscillating magnetic field that is oscillates in a direction opposite to that of the assist element 502. This is achieved by configuring the elements 502, 504, 506 such that current flowing through the outer elements 506, 504 flows in an opposite direction to that of the inner element 502. By way of example, as shown schematically in FIG. 5, a power source 508 is connected with leads 416a, 418a of element 506. Leads 514a, 514b, 514c, 514d connect the elements 506, 502, 504 in such a manner as to cause a current flow 512a, 512c through the elements 506, 504 that is opposite to the current flow 512b through the center element 502.

As seen in FIG. 5, the outer elements 504, 506 preferably extend laterally slightly beyond the edges of the write pole 302, whereas the center element 502 has a width that is significantly smaller than the width of the write pole 302. By reversing the polarity of the current (or voltage) across the elements 506, 504 relative to that of the element 504, the rotation of the magnetic oscillation (e.g. clockwise vs. counter-clockwise) is also reversed. In this way, the outer elements 504, 506 counteract the writing assistance from the center element 502, thereby greatly reducing the write width and preventing adjacent track interference. This allows the writing assistance of the magnetic oscillations to be employed while also preventing adjacent track interference.

Figure 6A:
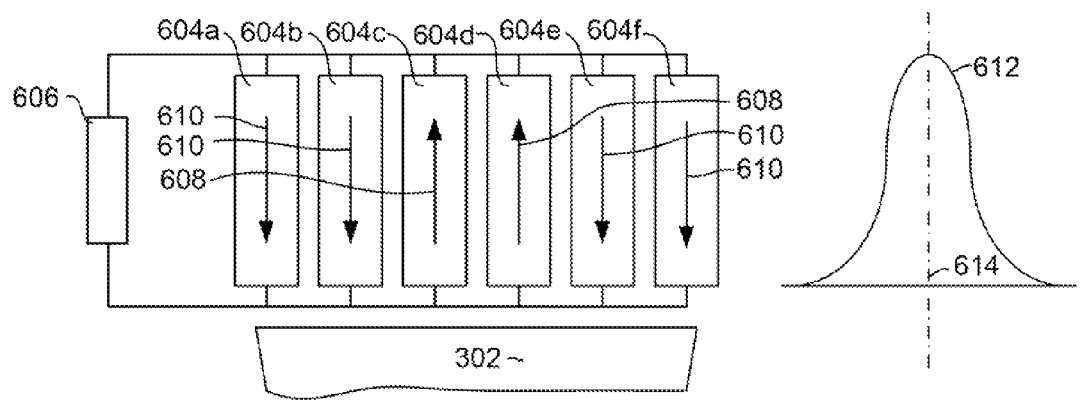
FIGS. 6a and 6b are schematic ABS views of a magnetic write head according to an alternate embodiment of the invention.
Figure 6B:
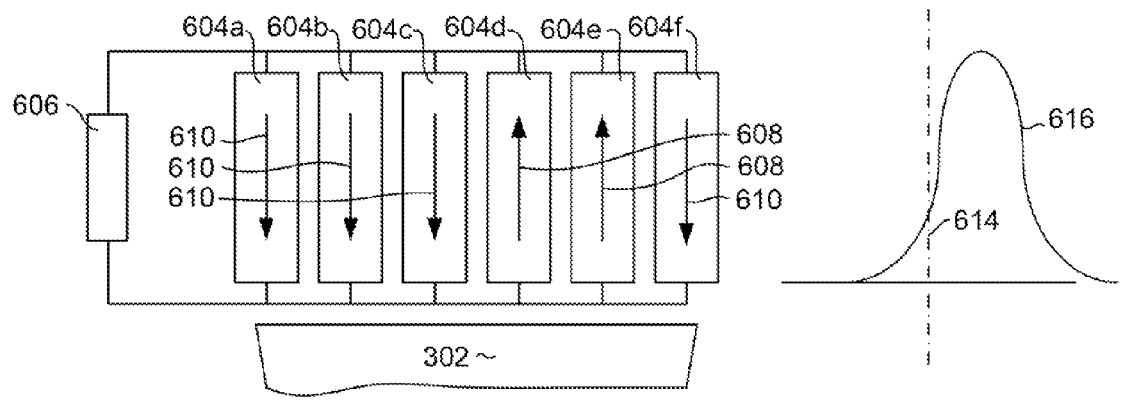

With reference now to FIGS. 6a and 6b, another embodiment of the invention allows the center of writing of a write pole to be shifted relative to a write pole center. This can be useful in compensating for skew when the slider on which the write head is formed is at an extreme inner or outer location on a write head. For example, FIG. 6a shows a head portion that has a plurality of magnetic oscillation generator elements 604a-f (greater than three elements). The detailed structures of the elements 604a-f are not shown in FIGS. 6a and 6b for purposes of clarity, but it should be understood that the elements 604a-f can include the various layers similar to the elements 502, 504, 506 of FIG. 5 or similar to the oscillation generator 320 of FIG. 4. For purposes of illustration six elements 604 are shown. However, this is by way of example as some other number of elements greater than three could be used.

As with the previously described embodiment, the magnetic oscillation generators are preferably located adjacent to the trailing edge of the write pole 302. The elements 604 are connected with circuitry 606 that is configured to deliver a voltage or current to the elements 604a-f in such a manner that the direction of current flow through each element can be switched relative to the others. For example in the structure of FIG. 6a the circuitry applies a voltage or current to the elements such that elements 604c, 604d have a current flow 608 in a first direction that will result in the elements 604c, 604d generating a magnetic writing assisting oscillation. On the other hand, the circuitry 604 is supplying a current or power to the elements 604a, 604b, 604e, 604f so that these elements have a current flow 610 that flows in an opposite direction that does not assist writing. In the embodiment shown in FIG. 6a the assisting elements 604c, 604d are centrally located over the write pole 302. Therefore, the magnetic writing will be focused on center of the write pole 302. This is represented graphically in FIG. 6a, where the curve 612 represents the field strength as measured along a radial of the disk and the dashed line 614 represents the center of the write pole 302.

As those skilled in the art will appreciate however, as the slider moves to extreme inner or outer portions of the disk the slider (and write head) will be at an as a result of skew. This skew angle can affect writing, and it would be desirable to adjust the center of focus of the writing, relative to the write pole 302 in order to compensate for this skew. The present invention allows for such compensation as can be seen in FIG. 6b. In FIG. 6b, the elements 604d and 604e have their currents 608 flowing in a direction that is oriented to cause the elements 604d and 604e to generate an oscillating magnetic field that is oriented to assist writing. Elements 604a, 604b, 604c and 604f have their currents flowing in an opposite direction (indicated by arrows 610) so that the generated oscillating magnetic fields from these elements do no assist recording. As can be seen then, the assist is offset from center. This can be seen in the graph at the right of FIG. 6b where the curve 616 is offset from the center of the write pole 302, which is represented by dashed line 614.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for magnetic data recording, comprising:
   a magnetic write pole having first and second sides and having a width defined by a distance between the first and second sides;
   a magnetic oscillation generator adjacent to the magnetic write pole, the magnetic oscillation generator further comprising:
   a centrally disposed assist element configured to generate an oscillating magnetic field that assists with magnetic data writing; and
   first and second non-assist elements each configured to generate an oscillating magnetic field that does not assist with magnetic data writing, the centrally disposed magnetic assist element being located between the first and second magnetic non-assist elements.

2. The magnetic write head as in claim 1 wherein the assist element is configured such that an electrical current flows through the assist element in a first direction, and wherein the first and second non-assist elements are configured such that electrical current flows through each of the first and second non-assist elements in a second direction that is opposite to the first direction.

3. The magnetic write head as in claim 1 further comprising circuitry connected with the assist element and with the non-assist element, the circuitry being functional to provide an electrical current to the assist element in a first direction and to provide an electrical current to the first and second non-assist elements in a second direction that is opposite to the first direction.

4. The magnetic write head as in claim 1 wherein the assist element and the first and second non-assist elements each generate a magnetic oscillation based on spin torque oscillation effect.

5. The magnetic write head as in claim 1 wherein each of the assist element and non-assist elements further comprises:
   a magnetic zone control layer;
   a magnetic field generation layer contacting the magnetic zone control layer;
   a magnetic interlayer contacting the magnetic zone control layer; and
   an electron spin rectifying layer contacting the magnetic interlayer.

6. The magnetic write head as in claim 1 wherein the assist element has a width that is smaller than the width of the write pole, and wherein each of the first and second non-assist elements extends beyond the side of the write pole.

7. The magnetic write head as in claim 1 wherein the assist element is separated from each of the first and second non-assist elements by a non-magnetic, electrically insulating separation layer.

8. The magnetic write head as in claim 1 wherein the assist element generates a magnetic field that oscillates in a first direction and each of the first and second non-assist elements generates a magnetic field that oscillates in a second direction that is opposite to the first direction.

9. A magnetic data recording system, comprising:
   a magnetic medium;
   an actuator;
   a slider connected with the actuator for movement adjacent to a surface of the magnetic medium;
   a write head formed on the slider, the write head including a magnetic write pole functional to emit a magnetic write field toward the magnetic medium and a magnetic oscillation generator, the magnetic oscillation generator structure further comprising:
   a centrally disposed assist element that generates a magnetic field that oscillates in a first direction to a magnetic oscillation in the magnetic medium to assist the magnetic write field in switching a magnetization of the magnetic medium; and
   first and second non-assist elements that each generate a magnetic field that oscillates in a second direction that is opposite to the first direction, the centrally disposed assist element being located between the first and second non-assist elements.

10. The magnetic data recording system as in claim 9 wherein the centrally disposed assist element and the first and second non-assist elements generate a magnetic field using spin torque oscillation.

11. The magnetic data recording system as in claim 9 wherein the centrally disposed assist element and the first and second non-assist elements each comprise:
   a magnetic zone control layer;
   a magnetic field generation layer contacting the magnetic zone control layer;
   a magnetic interlayer contacting the magnetic zone control layer; and
   an electron spin rectifying layer contacting the magnetic interlayer.

* * * * *